United States Patent Office 3,597,263
Patented Aug. 3, 1971

3,597,263
WATER LEAK DETECTORS
Allan R. Bancroft and Allan H. Dombra, Deep River, Ontario, Canada, assignors to Atomic Energy of Canada Limited, Ottawa, Ontario, Canada
No Drawing. Filed July 21, 1967, Ser. No. 654,986
Claims priority, application Canada, July 29, 1966, 966,739
Int. Cl. G01m 3/04
U.S. Cl. 117—94    35 Claims

ABSTRACT OF THE DISCLOSURE

Water leaks from containers or conduits are detected by chemical indicators. These may accumulate water at the leak source to give a clearly discernible colour change. Such indicator may be provided in the form of a non-corrosive easily removable paint or a non-corrosive adhesive tape with or without a protective transparent cover so as to facilitate direct application to a metal surface. The indicator can comprise (a) a carrier and a strontium chromate/silver sulphate couple as the active indicator, or (b) a carrier and a potassium ferrocyanide/ferric sulphate-inert brightener couple as the active indicator, or (c) a carrier and a potassium ferrocyanide/cupric sulphate-inert brightener couple as the active indicator. There may also be present an adhesive component, a fugitive dispersing component and a water miscibility improving component.

---

This invention relates to chemical moisture indicators for detecting leaks from water-containing containers or conduits at temperatures up to 550° F. In particular, it relates to the determination of the location of small heavy and light water leaks in nuclear power reactor systems. These leaks occur generally at various pipe and tubing fittings, valve stems and gasketed joints. The systems operate at temperatures up to 550° F. and water may escape therefrom in the form of vapor or liquid.

Although numerous instrumental and chemical methods of leak location are available, among them being ultrasonic detectors, tritium and other radioactive-isotope detectors, infrared and thermal conductivity detectors, conductivity tapes and probes, fluorescent tests, soap solutions and chemical preparations listed below, their usefulness in the nuclear power reactor systems is very limited because of the complexity of the systems, high temperature, radiation and other factors. This leaves visual inspection and spot-checking as the most successful method currently available for locating small leaks, of the order of 1 to 5 lb./day.

THE PRIOR ART (1) French Pat. 1,213,513 describes an indicating solution consisting of ammonium chloride, bromocresol purple, sodium alkylaryl sulfonate and alcohol. A material is impregnated with this and covered with transparent material through which the colour changes may be seen. However, this leak detector is unsuitable for many applications since it is unstable at temperatures in excess of about 250° F. and, because of presence of chloride, it may cause corrosion.

(2) Ammonium tetrathiocyanatocobaltate in isopropyl and isoamyl alcohol solution, has been suggested for use to impregnate paper and other fibrous materials so that such materials could be used as an indicator. This is, however, useful only below 200° F. since it decomposes at high temperatures.

(3) Papers which show water marks have also been suggested, i.e., paper lined by the "Ditto" process. Ozalid paper, and coloured crepe paper. However, these suffer from very low sensitivity and are stable only up to about 200° F.

(4) Tapes manufactured by the Allis-Chalmers Manufacturing Company consist of a transparent polyester backing on which a center pad of chemically treated fibers and electrical conductors is placed. Normally, the tape is used to indicate leakage by electrical means, but ammonium chloride or nitrate can be added to provide visual indication of leaks. This tape, however, is limited for use up to about 200° F., provides slow and indistinct colour indication which partially disappears as the tape dries, and requires adequate sealing protection, thus making its use impractical on uneven surfaces. The colour indication also requires application of voltage which makes it uneconomical for purely colour indication purposes.

(5) U.S. Pat. 2,966,467 describes a water indicating paste consisting of lead chloride and silver chromate mixed in a spar varnish, mineral spirit and xylene base. However, such formula suffers from inadequate temperature stability, possible chloride-induced corrosion, and very slow response to water, mainly due to unduly hydrophobic properties of the binder vehicle.

THE PRESENT INVENTION

An object of one aspect of the present invention is the provision of chemical indicators intended to improve the operator's ability to find small, ordinarily invisible leaks, and to find these and other larger leaks more rapidly.

An object of another aspect of the present invention is the provision of chemical indicators which accumulate water at the leak source, give a clearly discernible colour change, cause colour indication to spread in proportion to the leakage penetration, and thus make it possible for the operator to find small, ordinarily invisible leaks, by rapid examination of the indicators.

Embodiments of the aforesaid aspect of this invention are the provision of such indicators in the form a non-corrosive easily removable paint and a non-corrosive adhesive tape, with or without a protective transparent cover.

Thus, chemical indicators are now provided that can be applied directly to metal surfaces as a non-corrosive easily removed paint, or as a non-corrosive adhesive tape, or as a non-corrosive tape with imbedded flexible metal wires which can be interlocked to affix the tape. These tapes and paints produce colour change on contact with steam or water, but not at normal humidities for long periods at temperatures extending up to 550° F.

Chemical indicators are also now provided in the form of an adhesive tape with a transparent cover that affords protection against outside water splashes or other contamination. The tape produces colour change on contact with steam or water escaping from water-containing containers on which it is applied, but not at high humidities for long periods at temperatures up to 250° F.

By a broad aspect of this invention, a high temperature stable indicator is provided for detecting leaks from water-containing containers or conduits, said indicator comprising: (a) a carrier and a strontium chromate/silver sulphate couple as the active indicator, or (b) a carrier and a potassium ferrocyanide/ferric sulphate-inert brightener couple as the active indicator, or (c) a carrier and a potassium ferrocyanide/cupric sulphate-inert brightener couple as the active indicator.

By another aspect of this invention, the couple is in a vehicle including (a) A non-volatile binder for binding particulate material together and to the surface to which the indicator is applied.

(b) A non-volatile modified capable of improving the shelf life of the indicator and the water absorption properties of the dry coating produced from said indicator.

(c) A volatile diluent for improving the fluidity of the indicator.

By other aspects of the invention, the following moisture indicating media are provided for application to the exterior of water-containing containers or conduits for detecting leaks therefrom:

(A) a non-corrosive easily removed moisture-indicating paint including a substantially inert adhesive vehicle and couples (a), (b) or (c) hereinabove;

(B) an adhesive, non-corrosive, moisture-indicating tape including a substantially inert tape substrate and couples (a), (b) or (c) hereinabove;

(C) a non-corrosive, moisture-indicating tape including a substantially inert tape substrate provided with imbedded flexible metal wires and couples (a), (b) or (c) hereinabove;

(D) an adhesive, non-corrosive moisture-indicating tape including a substantially inert tape substrate provided with a transparent protective exterior cover and couples (a), (b) or (c) hereinabove;

(E) a porous pad, plug, ring or washer impregnated with couples (a), (b) or (c) hereinabove; and (F) non-porous substrate coated with a paint including couples (a), (b) or (c) hereinabove.

Two basic types of water indicating tapes and paints according to different aspects of the invention for use up to 250° F. and up to 550° F. are now provided.

The first basic type of tapes and paints for use up to 550° F. contain couple (a) hereinabove, e.g. the strontium chromate/silver sulphate couple, as the active indicator. The carrier base is formulated to provide good water absorption and adhesive stability of such high temperatures.

Tapes and paints for use up to 250° F. contain either couple (a) hereinabove, or couple (b) or (c) hereinabove, e.g., the potassium ferrocyanide/ferric sulphate-inert brightener couple or the potassium ferrocyanide/cupric sulphate-inert brightener couple as the active indicator. The carrier base is formulated to provide improved response to cold water and adhesive stability up to 250° F.

On contact with either water or steam couple (a) hereinabove, changes colour from bright yellow to deep red, due to the formation of silver chromate. The colour indication remains permanently. In paints and tapes the most practical concentration limits for the indicator are from 0.5 to 10 parts of strontium chromate to 1 part of silver sulphate. The colour change, however, is still apparent in mixtures containing from 0.05 to 50 parts of strontium chromate to 1 part of silver sulphate. Increased content of silver sulphate gives a deeper colour stain. Increased content of strontium chromate reduces costs and increases water absorption.

Couple (b) or (c) hereinabove contains 0.5 to 2 parts of potassium ferrocyanide to one part of ferric or cupric sulphate, plus a bright inert agent, preferably an insoluble or a sparingly soluble heavy-metal oxide. The inert brightening agent, or filler, establishes the original colour of the indicator and generally constitutes 50 to 90% of the mixture. Suitable brightening agents are white titanium dioxide or yellow lead monoxide. On contact with either water or steam, the system changes colour from white or yellow to deep blue with ferric sulphate, due to formation of ferric ferrocyanide complex; or to deep red with cupric sulphate, due to formation of cupric ferrocyanide complex.

The moisture-indicating tape and paint formulations of various aspects of this invention may be described as follows:

(A) WATER-INDICATING TAPES FOR 550° F. USE

These are generally double tapes, sewn or glued together with strontium chromate on one exterior face and silver sulphate on one interior face. Laboratory tests indicated that these tapes retain water-indicating ability, and do not discolour, after more than six months of exposure on 550° F. piping in humidities up to 80° F. dew point.

According to one aspect of this invention, these tapes may be prepared as follows. The individual indicator components, e.g. strontium chromate or silver sulphate, are first pulverized and dispersed in a medium which may contain other resins such as silicones or fluorocarbons. The polyorganosiloxanes which may be used include pure silicone resins and silicone/organic copolymers. While pure silicone resins are preferred, blends with alkyl or epoxy polymers are useful for lower temperature application. Examples of suitable such silicones include those known by the trademarks of Dow Corning Resin 801, Dow Corning Resin 804, Dow Corning Resin 805, Union Carbide R-64 and Union Carbide XR-630. Suitable fluorocarbon resins include polytetrafluoroethylene, poly(chlorotrifluoroethylene) and poly(vinylidene fluoride). The copolymer of chlorotrifluoroethylene and vinylidene fluoride known by the Trademark of Kel–F Resin 800 may advantageously be used. The aforesaid components are thus dispersed in a concentration of 2–5% by weight in a light oxygenated solvent such as dioxane, Cellosolves (the trademark for mono- and dialkyl ethers of ethylene glycol and their derivatives) or other glycol ethers. To improve consistency, hydrogenated terphenyls, heavier alcohols and glycol ethers such as n-butyl alcohol or Carbitol (the trademark for mono- and dialkyl ethers of diethylene glycol and their derivatives) in a concentration of 2–10% may be added. The individual indicator tapes are drawn through this medium in a container provided with guiding rolls, and dried continuously by passing them through a bank of heat lamps.

The dried individual indicator tapes are sewn or glued together, and cut in required lengths. This is followed by sewing, heat-sealing or solvent sealing of ordinary adhesive-tapes to the ends of the indicating tapes.

The tape itself is preferably made of a tightly woven glass cloth. Some other suitable materials would be matted fibreglass or woven or felted asbestos.

A particularly suitable adhesive tape is a fibreglass tape provided with a halide-free, thermosetting silicon-type adhesive. This retains adhesive strength at 550° F. for over two months. A suitable material for solvent sealing is xylene or toluene.

By another aspect of this invention, a tape which remains affixed securely on 550° F. piping and other metal surfaces for long periods can be prepared by imbedding flexible metal wires between the two tapes before joining them. These tapes are affixed by interlocking the imbedded wire strips.

(B) WATER-INDICATING TAPES FOR 250° F. USE

These are single tapes and are provided with couples (a), (b) or (c) hereinabove or mixtures thereof. Laboratory tests indicated that these tapes retain water-indicating ability, and do not discolour, after more than six months of exposure on 250° F. piping in normal humidities.

According to an aspect of this embodiment of this invention, these tapes may be prepared by drawing them through the indicator dispersion which for instance includes collodion as a binder, camphor, dimethyl phthalate or ethyl acetate as plasticizers, and ethylene glycol monomethyl ether as vehicle. Other suitable binder vehicles are spar varnishes, rosin and rosin esters, plasticized cellulose acetate, alkyld and other types of synthetic resins which are not too highly water resistant. To adjust consistency, hydrogenated terphenyls, n-butyl alcohol or Carbitol may be added. Addition of a plasticizer is desirable. For cellulose acetate, triphenyl phosphate plasticizer could be used. Solvent selection depends on the type of binder vehicle used. In most cases, mineral spirits, oxygenated solvents such as dioxane, Cellosolves and other glycol ethers may be used.

The tape itself is preferably made of a tightly woven glass cloth, although most fibrous, spongy and synthetic woven material scould be used. Natural fibers, for example, linen, cotton, sisal, canvas and kraft paper would be suitable. Also synthetic fibres, for example, rayon, polyester, nylon and foamed plastics such as open-cell polyurethane sheeting may be used.

By another aspect of this invention, a non-powdery tape with a transparent protective cover and adhesive backing along the entire length of the tape may be prepared as follows. The indicator dispersion is sprayed on one side of the tape. A slightly wider, transparent adhesive tape is then placed on the powdery side of the indicating tape, thus providing adhesive edges along the entire length of the tape and a protection against outside water splashes, oil and other contamination. Laboratory tests indicated that these tapes remain effective for over two months on 250° F. piping, and after repeated brief exposures to saturated atmospheric humidity conditions.

A suitable cover material is a cellulose acetate or a polyester tape with a halide-free pressure sensitive adhesive.

(C) WATER-INDICATING PAINT FOR 550° F. USE

According to another aspect of this invention, the paint for 550° F. use may be prepared by dispersing the indicator powders, forming couple (a) hereinabove in a vehicle which may consist for instance of one part by weight of a silicone resin, for example Dow Corning Resin 801 and nineteen parts by weight of dioxane. Fluorocarbon resins, for example Kel-F Resin 800 could also be used. Hydrogenated terphenyls, n-butyl alcohol or carbitol may be added to adjust consistency. Suitable solvents include dioxane, glycol ethers and commercial preparations such as Aultcraft Reducer OT-93 which is a trademark for a paint thinner consisting mainly of high aromatic hydrocarbons. Antisettling and pigment suspension agents for example montmorillonite and dried bentonite clays may also be incorporated therein.

The formulation meets the general requirements of an adherent easily removed, non-corrosive water-indicating coating for metal surfaces. Test exposures of paint applied on 550° F. piping in normal atmospheric conditions showed no deterioration after four months.

(D) WATER-INDICATING PAINT FOR 250° F. USE

This paint has improved response to cold water and slightly better adhesion than the paint for 550° F. use, but it can be easily removed by wire-brushing. Test exposures of this paint applied on 250° F. piping in normal atmosphere showed no deterioration after six months.

According to a further aspect of this invention, this paint can be prepared by dispersing the indicator powders, forming couples (a), (b) or (c) hereinabove in a vehicle which may for instance consist of 10% spar varnish in dioxane. Other suitable binders include rosin and rosin esters, terpene hydrocarbon resins, terpene phenolic resins, polyvinyl alcohol, alkyd and other synthetic resins which are not too highly water resistant. Driers for example, calcium naphthenate or lead naphthenate could also be added. Solvents and antisettling agents described hereinbefore for the paint for 550° F. use are suitable.

While the present invention has been described for tapes and paints, other water-indicating systems may be used in rigid form such as pads, plugs or rings. For example, foamed plastics and other spongy materials may be impregnated with the indicator composition. The plastic may then be die cut to produce split rings or washers for use on valve stems (valve stem leak detectors). Other forms which may also be used include adhesive pads or plugs for inserting under insulation to detect leakage under pipe lagging.

The paint may also be sprayed or painted on piping insulation or on cotton, fiberglass or other absorbent material wrapped, in form of a shroud, on pipe fittings. Clear plastic sheeting may also be painted in any desired pattern and then used to prepare water-indicating shrouds.

The paint may also be sprayed on paper, plastic or metal panels which can then be placed on the floor, under banks of fittings or in other places where drops of water may fall. Spray-painted plastic panels have been used extensively in one nuclear power station, and detected several leaks under complex network of hydraulic lines, such as near instrument panels.

The following are examples of aspects of this invention.

EXAMPLE (A)

Water indicating tape for 550° F. use

Impregnating Medium—mixing formula

| Outer Tape: | Percent |
|---|---|
| Strontium chromate | 50.0 |
| Dow Corning Resin "801" | 2.0 |
| Dioxane | 48.0 |
| | 100.0 |

| Inner Tape: | |
|---|---|
| Silver sulphate | 50.0 |
| Dow Corning Resin "801" | 2.0 |
| Dioxane | 48.0 |
| | 100.0 |

| Dry Tape: | |
|---|---|
| Strontium chromate | 96.2 |
| Dow Corning Resin "801" | 3.8 |
| | 100.0 |
| Silver sulphate | 96.2 |
| Dow Corning Resin "801" | 3.8 |
| | 100.0 |

Indicating tape.—Fibreglas, plain weave, style 128 (Owens-Corning Fibreglas Corporation)

Adhesive ends.—Mystic Tape No. 7100 (Sellotape Canada Ltd.).

EXAMPLE (B)

Water-indicating tape for 250° F. use

Impregnating Medium

| Mixing Formula: | Percent |
|---|---|
| Strontium chromate | 33⅓ |
| Silver sulphate | 16⅔ |
| Collodion (4% Soln. of nitrocellulose in ethanol and ethyl ether) | 10.0 |
| Camphor | 1.0 |
| Dimethyl phthalate | 2.5 |
| n-Butyl alcohol | 5.0 |
| Ethyl acetate | 1.0 |
| Ethylene glycol monomethyl ether | 30.5 |
| | 100.0 |

| Dry Tape: | |
|---|---|
| Strontium chromate | 61.85 |
| Silver sulphate | 30.90 |
| Nitrocellulose | 0.75 |
| Camphor | 1.85 |
| Dimethylphthalate | 4.65 |
| | 100.0 |

Indicating tape.—Fibreglas, plain weave, style 128 (Owens-Corning Fibreglas Corporation).

Cover.—Scotch Brand Magic Transparent Tape No. 810 (Minnesota Mining and Manufacturing of Canada Ltd.).

EXAMPLE (C)

Water-indicating paint for 550° F. use

Mixing Formula:

| | Percent |
|---|---|
| Strontium chromate | 40.0 |
| Silver sulphate | 20.0 |
| Dow Corning Resin "801" | 2.0 |
| Bentone "34" (the trade name for a brand of montmorillonite) of Can. Titanium Pigments Ltd. | 1.0 |
| Aultcraft Reducer OT-93 (Aultcraft Paint Ltd.) | 37.0 |
| | 100.0 |

Dry Paint:

| | |
|---|---|
| Strontium chromate | 63.5 |
| Silver sulphate | 31.7 |
| Dow Corning Resin "801" | 3.2 |
| Bentone "34" | 1.6 |
| | 100.0 |

NOTE: The above mixing formula of 63% solids is used for brushing. For spraying, the solids are reduced to 50% with solvent Aultcraft Reducer OT-93. Composition of the dried paint is the same in both cases.

EXAMPLE (D)

Water-indicating paint for 250° F. use

Mixing Formula:

| | |
|---|---|
| Potassium ferrocyanide | 5.0 |
| Ferric sulphate | 5.0 |
| Titanium dioxide | 40.0 |
| Roxaline Varnish X-309 (a trademark for an oleoresinous spar varnish usually made from tung oil and a phenolic resin. Roxaline of Canada Ltd.) | 5.0 |
| Bentone "34" | 1.0 |
| Dioxane | 44.0 |
| | 100.0 |

Dry Paint:

| | Percent |
|---|---|
| Potassium ferrocyanide | 8.95 |
| Ferric sulphate | 8.95 |
| Titanium dioxide | 71.35 |
| Roxaline Varnish X-309 | 8.95 |
| Bentone "34" | 1.80 |
| | 100.00 |

NOTE: Mixing formula of 56% solids is used for brushing, and 45% solids for spraying.

Field tests

The tapes and paints have been tested in two nuclear power stations by applying to several thousand fittings. During a six month period about thirty important leaks were found. Field experience confirms laboratory findings that these paints and tapes remain effective under the conditions described hereinabove after more than six months of exposure.

Comparison with U.S. Pat. 2,966,467

U.S. Pat. 2,966,467 is directed to the following formulation:

Part 1, solid—equal parts by weight of lead chloride and silver chromate.

Part 2, vehicle—one part by volume marine spar varnish and three parts by volume of benzol.

The composition of one aspect of this invention which was compared was:

Part 1, solid—equal parts by weight of strontium chromate and silver sulphate.

Part 2, vehicle—one part by weight of Dow Corning Resin 801 and nineteen parts of Aultcraft Reducer OT-93.

(1)

(a) The composition of the above identified prior art was found to show discolouration after 3–5 days of storage in ovens at 450° F. while the composition of this aspect of the present invention remained stable for over one month.

(b) In 550° F., ovens, the composition of the above identified prior art showed deterioration after 1–2 days, while the composition of this aspect of the present invention remained stable for more than one week.

(c) Test exposures on 400° F. piping in normal atmosphere indicated that the composition of the prior art remains stable for about one month, while the composition of this aspect of the present invention remains stable on 550° F. piping for more than six months.

(2) The heat stability of the indicator system used in the composition of the above identified prior art was found to be inferior to the indicator system used in the composition of this aspect of the present invention when tested in the same vehicle consisting of Spar "776" varnish, hydrogenated terphenyl and dioxane. The silver chromate and lead chloride system of the composition of the prior art discoloured in ovens at 350° F. after about 2–3 weeks, while strontium chromate and silver sulphate couple of the composition of this aspect of the present invention remained stable for over one month. This was ture with mixtures tested as paints or impregnated in fiber-glass tapes.

(3) The composition of the above identified prior art reacted much more slowly, and with a less distinct colour change with either water or steam. The colour change was also affected by pH and water temperature. At high pH (above 9.0) the precipitated lead chromate was orange; at pH 9.0 to 5.0 it was generally yellow and at low pH it was greenish yellow. At high temperatures (when tested on hot plate at about 400° F.) a white spot was formed due to leaching out of lead chloride.

The colour of strontium chromate and silver sulphate of the composition of this aspect of the present invention was unaffected by pH or temperature and always changed from yellow to dark brownish red.

(4) The binder vehicle used in the composition of the above identified prior art was found to be very hydrophobic and did not react well with cold (60–70° F.) water. Water drops fell off. On the other hand, the formulation of the composition of this aspect of the present invention absorbed water at this temperature and permitted spreading of the "colour spot." Furthermore, since this composition of the above identified prior art contains chlorides, it cannot be used on some materials, especially stainless steels because it accelerates corrosion.

We claim:

1. A high temperature stable indicator for detecting leaks from water containing containers or conduits, said indicator consisting essentially of an active indicator material selected from the group consisting of a strontium chromate/silver sulphate couple; a potassium ferrocyanide/ferric sulphate couple and a potassium ferrocyanide/cupric sulphate couple, said active indicator material being in combination with a liquid medium which is essentially a non-solvent for the salts forming the couple as carrier material.

2. The indicator of claim 1 comprising a strontium chromate/silver sulphate couple wherein the ratio of strontium chromate to silver sulphate is from 0.05–50 parts strontium chromate to one part silver sulphate.

3. The indicator of claim 2 wherein the ratio of strontium chromate to silver sulphate is from 0.5–10 parts strontium chromate to one part silver sulphate.

4. The indicator of claim 2 wherein the ratio of strontium chromate to silver sulphate is from 1 to 2 parts strontium chromate to one part silver sulphate.

5. The indicator of claim 1 comprising a potassium ferrocyanide/ferric sulphate couple wherein the ratio of potassium ferrocyanide to ferric sulphate is from 0.5–2 parts of potassium ferrocyanide to one part of ferric sulphate.

6. The indicator of claim 1 comprising a potassium ferrocyanide/cupric sulphate couple wherein the ratio of potassium ferrocyanide to cupric sulphate is from 0.5–2 parts potassium ferrocyanide to 1 part cupric sulphate.

7. An indicator as claimed in claim 1 in which the potassium ferrocyanide/ferric sulphate couple or the potassium ferrocyanide/cupric sulphate couple includes a brightening pigment which enhances the color of the couple.

8. The indicator of claim 7 wherein the amount of brightening pigment is 50–90% by weight.

9. An indicator as claimed in claim 7 in which the brightening pigment is a heavy metal oxide.

10. An indicator as claimed in claim 1 in which the liquid medium comprises a volatile non-solvent for said salts and a non-volatile resin binder.

11. The indicator of claim 10 wherein the resin binder is a silicone resin or fluorocarbon resin present in an amount from 2 to 5%.

12. The indicator of claim 10 wherein said medium comprises mineral spirits, a glycol ether, or dioxane.

13. The indicator of claim 12 wherein said medium comprises 2–10% of a hydrogenated terphenyl, a high molecular weight alcohol, or a mono- or dialkyl ether of diethylene glycol.

14. The indicator of claim 10 wherein the said binder is collodion, a spar varnish, a roson, a rosin ester, a plasticized cellulose acetate resin, a terpene hydrocarbon resin, or a terpene phenolic resin.

15. The indicator of claim 14 including a plasticizer selected from the group consisting of camphor, dimethyl phthalate, ethyl acetate and triphenyl phosphate.

16. The indicator of claim 10 in the form of a dry coating on conduit insulation.

17. The indicator of claim 10 in the form of a dry coating on a shroud mounted on said conduit.

18. An indicator as claimed in claim 10 in which the liquid medium is a paint vehicle and includes a non-volatile modifier for improving the water absorption properties of the active indicator material.

19. A high temperature stable indicator for detecting leaks from water containing containers or conduits, said indicator consisting essentially of an active indicator material selected from the group consisting of a strontium chromate/silver sulphate couple; a potassium ferrocyanide/ferric sulphate couple and a potassium ferrocyanide/cupric sulphate couple, said active indicator material being in combination with a porous substrate as carrier material.

20. The indicator of claim 19 wherein said carrier is a tape which does not substantially affect the stability or water indicating ability of the active indicator material.

21. The indicator of claim 20 wherein the tape is provided with an adhesive surface.

22. The indicator of claim 20 wherein the tape is provided with imbedded metal wires.

23. The indicator of claim 20 wherein the tape is formed of fiberglass.

24. The indicator of claim 20 wherein a pair of tape components are united in face-to-face contact to form a double tape wherein one component of said couple is on one such tape component and the other component of said couple is on the other such tape component.

25. The indicator of claim 24 provided with a halide-free thermosetting adhesive.

26. The indicator of claim 20 provided with a protective cover.

27. The indicator of claim 19 in the form of impregnation on a pad, plug, ring or washer.

28. The indicator of claim 27 wherein the pad, plug, ring or washer is formed of a spongy material.

29. An indicator as claimed in claim 19 in which the potassium ferrocyanide/ferric sulphate couple or the potassium ferrocyanide/cupric sulphate couple includes a brightening pigment which enhances the color of the couple.

30. The indicator of claim 29 wherein the amount of brightening pigment is 50–90% by weight.

31. The indicator of claim 19 comprising a strontium chromate/silver sulphate couple wherein the ratio of strontium chromate to silver sulphate is from 0.05–50 parts strontium chromate to one part silver sulphate.

32. The indicator of claim 31 wherein the ratio of strontium chromate to silver sulphate is from 0.5–10 parts strontium chromate to one part silver sulphate.

33. The indicator of claim 31 wherein the ratio of strontium chromate to silver sulphate is from 1 to 2 parts strontium chromate to one part silver sulphate.

34. The indicator of claim 19 comprising a potassium ferrocyanide/ferric sulphate couple wherein the ratio of potassium ferrocyanide to ferric sulphate is from 0.5–2 parts of potassium ferrocyanide to one part of ferric sulphate.

35. The indicator of claim 19 comprising a potassium ferrocyanide/cupric sulphate couple wherein the ratio of potassium ferrocyanide to cupric sulphate is from 0.5–2 parts potassium ferrocyanide to 1 part cupric sulphate.

References Cited

UNITED STATES PATENTS

| | | | |
|---|---|---|---|
| 2,526,938 | 10/1950 | Davis et al. | 252—408 |
| 2,966,467 | 12/1960 | Nesh | 106—228X |
| 3,078,182 | 2/1963 | Crome et al. | 117—68.5 |
| 3,121,615 | 2/1964 | Price | 23—253(TP)UX |

RALPH S. KENDALL, Primary Examiner

U.S. Cl. X.R.

23—253; 73—40.5; 116—114; 117—122, 126, 138.8, 161, 169; 137—551; 165—11; 285—93